April 22, 1924.

T. O. WERNER

CLUTCH

Filed June 10, 1920

1,490,951

Witness

Inventor
THOS. O. WERNER

Patented Apr. 22, 1924.

1,490,951

UNITED STATES PATENT OFFICE.

THOMAS ODENWELDER WERNER, OF BANGOR, PENNSYLVANIA.

CLUTCH.

Application filed June 10, 1920. Serial No. 387,954.

*To all whom it may concern:*

Be it known that I, THOMAS O. WERNER, a citizen of the United States, residing at Bangor, in the county of Northampton and State of Pennsylvania, have invented a new and useful Clutch, of which the following is a specification.

This invention relates to a friction clutch for use where a predetermined amount of friction is desired for coupling a driving member to a driven member, one of the objects of the invention being to provide a clutch element made up of segments which are adjustably and yieldingly connected whereby the frictional contact between the parts can be varied to meet the conditions under which the parts are working.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings

Figure 1:
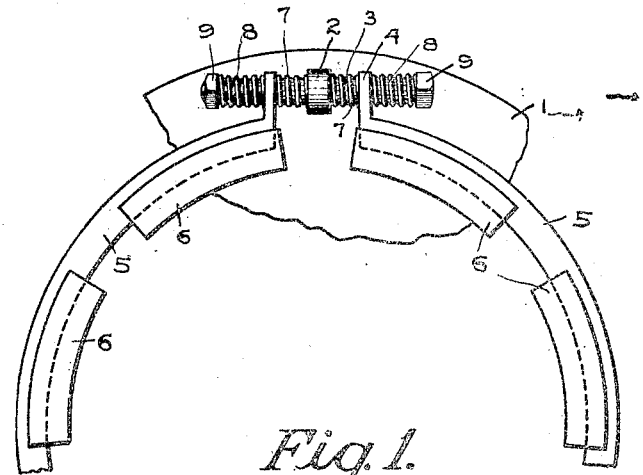
Figure 1 is a face view of a portion of a clutch embodying the present improvement.
Figure 2:
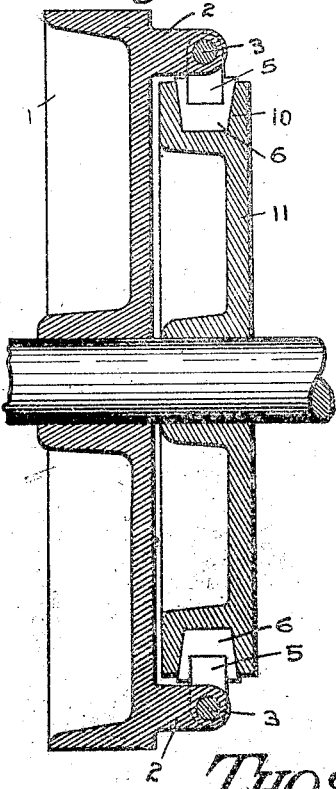
Figure 2 is a section through the complete clutch.

Referring to the figures by characters of reference 1 designates the driving member which can be of any form desired and which is provided, at desired intervals, with laterally extending studs 2 in each of which is slidably mounted a bolt 3. This bolt is extended through ears 4 outstanding from the ends of arcuate holding bands or sections 5 to the inner surfaces of which are fastened, in any suitable manner, friction shoes 6 formed of any desired material. Coiled springs 7 are mounted on the bolt 3 between the studs 2 and the ears 4 and additional coiled springs 8 are mounted on the bolt between the ears 4 and the heads 9 on the bolt. Obviously one of these heads can be in the form of a removable nut whereby the parts can be assembled readily.

The shoes 6 are adapted to fit snugly within a peripheral groove 10 formed in the driven member 11. By means of the adjustable heads or nuts 9 the springs 7 and 8 can be placed under any desired degrees of compression so as to hold the shoes 6 clamped with desired pressure upon the walls of the groove 10 so that a predetermined amount of friction will be secured and motion will be transmitted from the driving to the driven member unless said driven member should be subjected to sufficient resistance to overcome the frictional engagement between the parts.

It will be noted that the bands or sections 5 have a floating connection with the driving member 1, these members being held apart yieldingly by the springs 7 while the springs 8, bearing against the gears 4, serve to press the bands with desired force against the driven member 11.

It is to be understood that any desired number of projections or studs 2 can be used and that one holding band 5 will be interposed between every two of these studs.

While the driven member shown in the drawing is provided with a single annular groove it is to be understood that the same may be provided with more than one groove or can be made with a plain periphery free of grooves.

What is claimed is:

1. In a friction clutch the combination with a driving member and a driven member, both mounted for rotation about a common axis, of friction elements embracing one of the members, means slidably connected to the other member and slidably engaged by the friction elements for providing a floating connection between the friction elements and said last named member, yielding means interposed between the end portions of the friction elements for retarding the movement of the friction elements toward each other, and yielding means bearing against the end portions of the friction elements for retarding the movement of said elements from each other.

2. In a friction clutch the combination with a driving member and a driven member both mounted for rotation about a common axis, of bolts slidably mounted between their ends upon one of the members, friction elements embracing the other member, outstanding portions upon the friction elements and slidably mounted on the bolts, said elements being mounted to float or shift freely relative to the member to which they are connected, yielding means on the bolts and interposed between the outstanding portions for retarding the movement of the friction elements toward each other, yielding means upon the bolts for bearing against the outstanding portions, and means for adjusting the bolts to vary the action of said yielding means and to regulate the pressure of the friction elements upon the member embraced thereby.

3. In a friction clutch the combination with a driving member and a driven member both mounted for rotation, and an annular friction surface upon one of the members, of studs upon the other member, bolts slidably mounted within the studs, arcuate holding bands having outturned end portions slidably engaging the bolts, springs upon each bolt between the studs and the ends of the bands, springs interposed between the ends of the bands and the ends of the bolts, and means engaging each bolt for adjusting the compression of the springs, and friction elements upon each band for engaging the friction surface.

In testimony that I claim the foregoing as my own, I have hereto affixed my signature in the presence of two witnesses.

THOMAS ODENWELDER WERNER.

Witnesses:
WILLIAM H. LINDEMAN,
MILDRED W. WILLIAMS.